United States Patent
Tsai

(10) Patent No.: US 11,791,754 B1
(45) Date of Patent: Oct. 17, 2023

(54) MOTOR DRIVER HAVING AUTOMATIC PHASE SWITCHING MECHANISM

(71) Applicant: ANPEC ELECTRONICS CORPORATION, Hsinchu (TW)

(72) Inventor: Ming-Jung Tsai, Changhua County (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 17/868,120

(22) Filed: Jul. 19, 2022

(30) Foreign Application Priority Data

May 25, 2022 (TW) .................................. 111119382

(51) Int. Cl.
*H02P 6/18* (2016.01)
*H02P 6/182* (2016.01)
*H02P 21/22* (2016.01)

(52) U.S. Cl.
CPC .............. *H02P 6/182* (2013.01); *H02P 21/22* (2016.02)

(58) Field of Classification Search
CPC .. H02P 6/182; H02P 21/22; H02P 6/20; H02P 6/21
USPC .................................................. 318/400.34
See application file for complete search history.

(56) References Cited

U.S. PATENT DOCUMENTS

| 6,483,270 | B1 * | 11/2002 | Miyazaki | H02P 6/182 318/705 |
| 2004/0080293 | A1 * | 4/2004 | Kurosawa | H02P 6/182 318/400.11 |
| 2008/0100243 | A1 * | 5/2008 | Kurosawa | H02P 6/182 318/430 |
| 2009/0058338 | A1 * | 3/2009 | Takeuchi | H02P 6/16 318/400.13 |
| 2014/0340009 | A1 * | 11/2014 | Reynolds | H02P 6/182 318/400.11 |

* cited by examiner

*Primary Examiner* — Erick D Glass
(74) *Attorney, Agent, or Firm* — Li & Cai Intellectual Property (USA) Office

(57) ABSTRACT

A motor driver having an automatic phase switching mechanism is provided. After a three-phase motor is started up, a back electromotive force detecting circuit starts detecting a back electromotive force signal of each of three phases of the three-phase motor. A driving waveform generating circuit extracts parts of a plurality of first wave segment patterns from a first wave segment pattern signal as a plurality of first wave segments of a first waveform signal according to the back electromotive force signal. A motor controlling circuit controls the motor driving circuit to drive the three-phase motor to rotate normally according to the first waveform signal.

11 Claims, 8 Drawing Sheets

MOTOR DRIVER HAVING AUTOMATIC PHASE SWITCHING MECHANISM

CROSS-REFERENCE TO RELATED PATENT APPLICATION

This application claims the benefit of priority to Taiwan Patent Application No. 111119382, filed on May 25, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor, and more particularly to a motor driver having an automatic phase switching mechanism.

BACKGROUND OF THE DISCLOSURE

In electronic devices, fans are used to cool heat generating components such as processors. When the heat generating components are cooled down by the fans, data from circuits of the fans must be instantly obtained so as to precisely control rotational speeds of motors of the fans according to the obtained data, such that the fans can properly cool down the heat generating components with efficiency. However, a conventional motor controller circuit cannot drive the motor to stably rotate at a target rotational speed under the condition that only low noise can be generated by the motor.

SUMMARY OF THE DISCLOSURE

In response to the above-referenced technical inadequacies, the present disclosure provides a motor driver having an automatic phase switching mechanism. The motor driver is applicable to a three-phase motor. The motor driver includes a motor controlling circuit, a motor driving circuit, a back electromotive force detecting circuit, a wave segment pattern storing circuit, and a driving waveform generating circuit. The motor controlling circuit is configured to output a startup controlling signal and a normal rotation controlling signal. The motor driving circuit is connected to the motor controlling circuit. The motor driving circuit is configured to output a motor startup signal to the three-phase motor to start up the three-phase motor according to the startup controlling signal. After the three-phase motor is started up, the motor driving circuit is configured to output a normal rotation driving signal to the three-phase motor to drive the three-phase motor to rotate normally according to the normal rotation controlling signal. The back electromotive force detecting circuit is connected to the three-phase motor. The back electromotive force detecting circuit is configured to start detecting a voltage level of a back electromotive force signal of each of three phases of the three-phase motor to output a back electromotive force detected signal after the three-phase motor is started up. The wave segment pattern storing circuit is configured to store a first wave segment pattern signal having a plurality of first wave segment patterns of a plurality of first waveform patterns. The driving waveform generating circuit is connected to the back electromotive force detecting circuit, the wave segment pattern storing circuit and the motor controlling circuit. The driving waveform generating circuit extracts parts of the plurality of first wave segment patterns from the first wave segment pattern signal as a plurality of first wave segments of a first waveform signal. The driving waveform generating circuit outputs the first waveform signal. The motor controlling circuit outputs the normal rotation controlling signal according to the first waveform signal.

In certain embodiments, the back electromotive force detecting circuit detects zero crossing points at which a first one of a plurality of waveforms of the back electromotive force signal of each of the three phases of the three-phase motor respectively transits from a high level to a low level and from the low level to the high level to output the back electromotive force detected signal. Each of the zero crossing points is a time point at which the back electromotive force signal reaches a zero value.

In certain embodiments, the back electromotive force detecting circuit detects a zero crossing point at which each one of a plurality of waveforms of the back electromotive force signal of each of the three phases of the three-phase motor transits from a low level to a high level to output the back electromotive force detected signal except for a first one of the plurality of waveforms of the back electromotive force signal. The zero crossing point is a time point at which the back electromotive force signal reaches a zero value.

In certain embodiments, the driving waveform generating circuit determines which parts of the plurality of first wave segment patterns are extracted as the plurality of first wave segments of the first waveform signal, according to the back electromotive force detected signal indicating a zero crossing point at which the back electromotive force signal transits from a low level to a high level. The zero crossing point is a time point at which the back electromotive force signal reaches a zero value.

In certain embodiments, the driving waveform generating circuit determines which parts of the plurality of first wave segment patterns are extracted as the plurality of first wave segments of the first waveform signal, according to the back electromotive force detected signal indicating a zero crossing point at which the back electromotive force signal transits from a high level to a low level. The zero crossing point is a time point at which the back electromotive force signal reaches a zero value.

In certain embodiments, when a voltage of the back electromotive force signal is higher than a zero value, the driving waveform generating circuit extracts parts of the plurality of first wave segment patterns from the first wave segment pattern signal as the plurality of first wave segments of the first waveform signal outputted within a time after the voltage of the back electromotive force signal decreases to the zero value.

In certain embodiments, when a voltage of the back electromotive force signal is lower than a zero value, the driving waveform generating circuit extracts parts of the plurality of first wave segment patterns as the plurality of first wave segments of the first waveform signal outputted within a time after the voltage of the back electromotive force signal increases to the zero value.

In certain embodiments, the back electromotive force detecting circuit includes a comparing circuit. A first input terminal of the comparing circuit is connected to the three-phase motor and receives the back electromotive force signal from the three-phase motor. A second input terminal of the comparing circuit is coupled to a reference voltage. The comparing circuit compares a voltage of the back electromotive force signal with the reference voltage to output the back electromotive force detected signal.

In certain embodiments, the reference voltage is half of a sum of a peak value and a valley value of a waveform of the back electromotive force signal.

In certain embodiments, the driving waveform generating circuit compares a plurality of values of the first waveform signal with that of a second waveform signal to output a driving waveform signal. The motor controlling circuit adjusts the normal rotation controlling signal outputted to the motor driving circuit according to the driving waveform signal.

In certain embodiments, a plurality of waveforms of the second waveform signal include triangle waveforms, sawtooth waveforms, or a combination thereof.

In certain embodiments, a plurality of waveforms of the first waveform signal include sinusoidal waveforms, third harmonic waveforms, or a combination thereof.

As described above, the present disclosure provides the motor driver having the automatic phase switching mechanism. After the three-phase motor is started up, the motor driver of the present disclosure can detect the zero crossing points at which the back electromotive force signal respectively transits from the high level to the low level and transits from the low level to the high level, and accordingly determine the waveforms of the first waveform signal that are used to quickly drive the three-phase motor to rotate normally.

If a phase of the three-phase motor of a fan of a handheld device in a moving condition or other conditions is not as expected, the motor driver of the present disclosure can automatically change the phase of the three-phase motor, such that the three-phase motor can operate normally.

Regardless of a phase of the back electromotive force, the motor driver of the present disclosure can detect the back electromotive force signal within a short detecting time and accordingly quickly drive the three-phase motor to rotate normally, thereby reducing vibration and noise of the three-phase motor.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
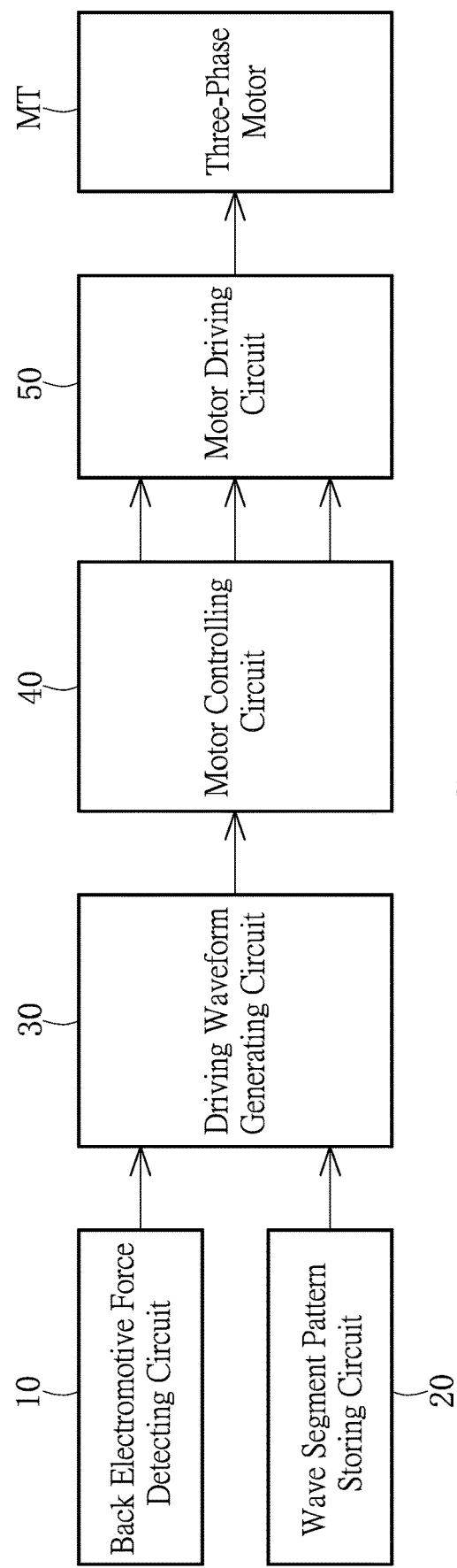
FIG. 1 is a block diagram of a motor driver having an automatic phase switching mechanism according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
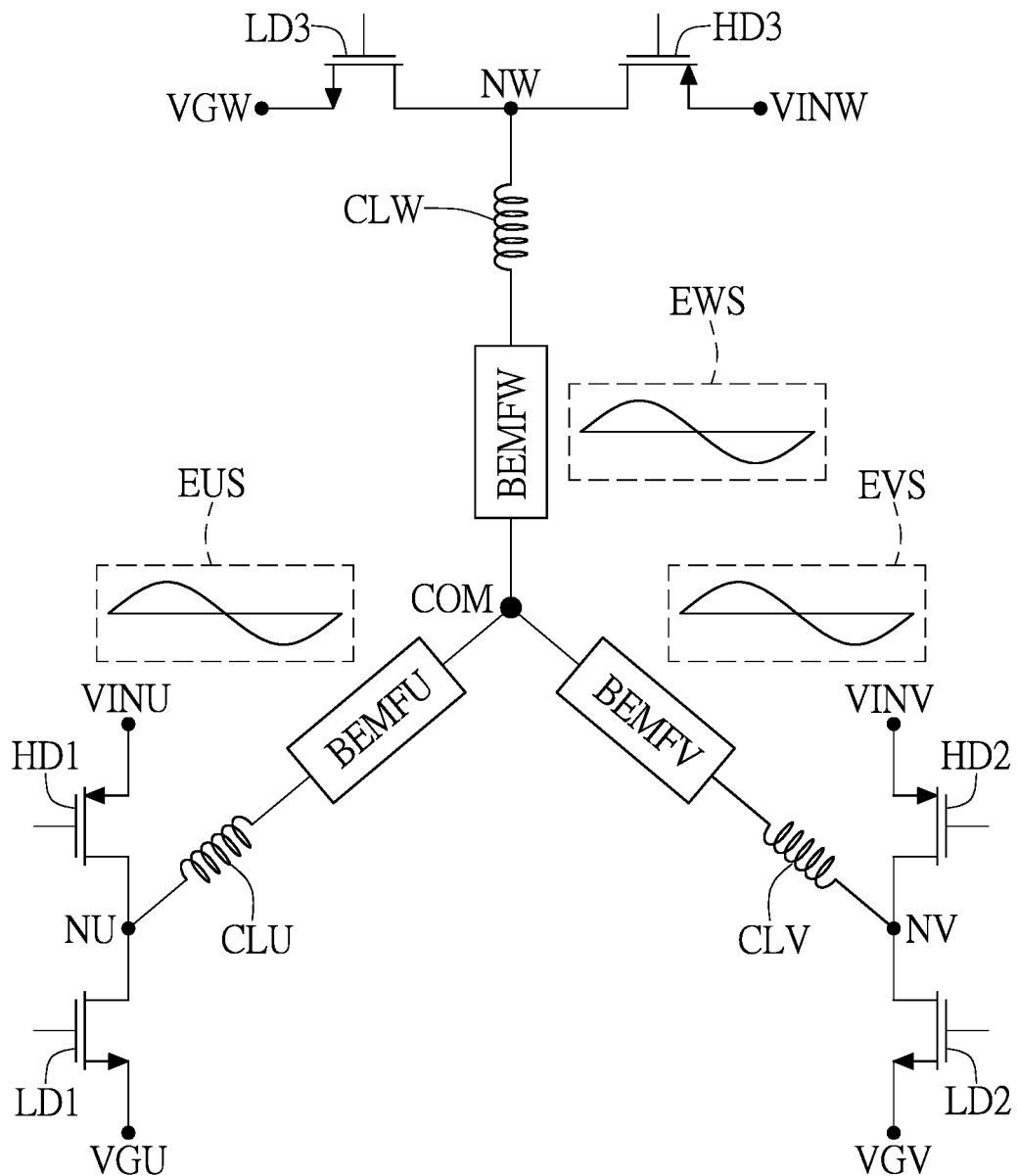
FIG. 2 is a circuit diagram of a three-phase motor and a motor driving circuit of the motor driver having the automatic phase switching mechanism according to the embodiment of the present disclosure.
Figure 3:
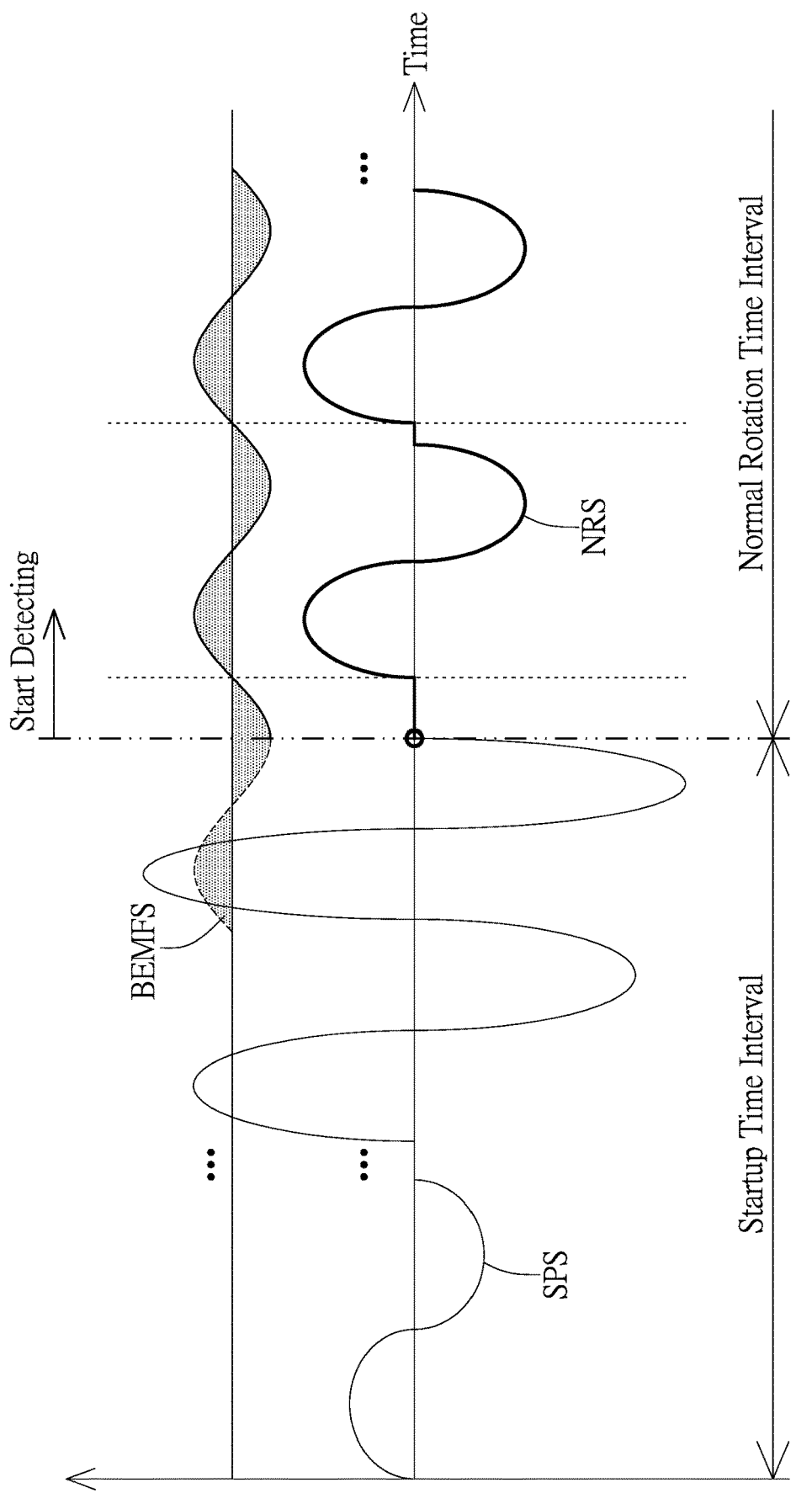
FIG. 3 is a waveform diagram of signals of the motor driver having the automatic phase switching mechanism according to the embodiment of the present disclosure.
Figure 4:
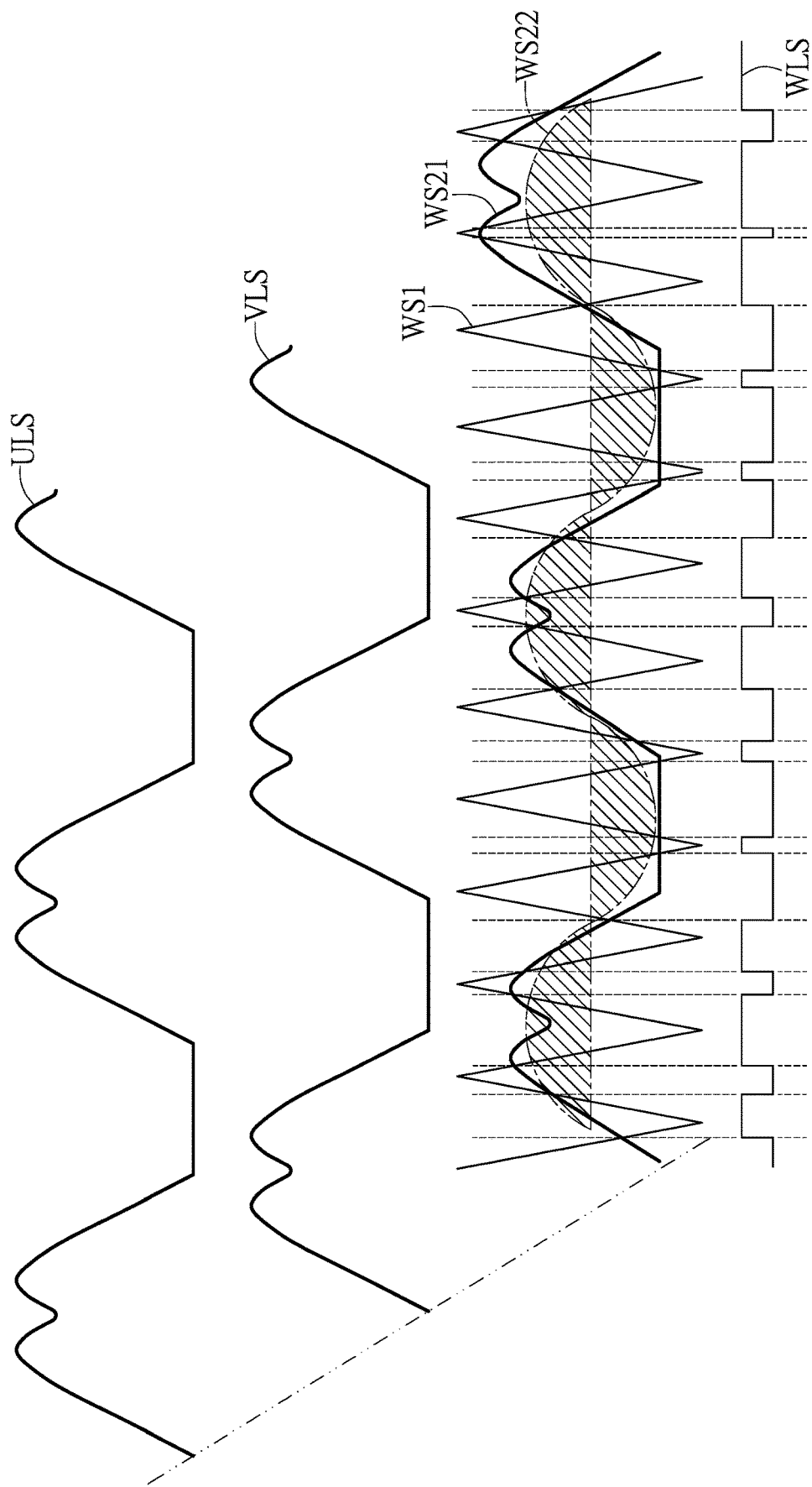
FIG. 4 is a waveform diagram of signals of the motor driver having the automatic phase switching mechanism according to the embodiment of the present disclosure.

Reference is made to FIGS. 1 to 4, in which FIG. 1 is a block diagram of a motor driver having an automatic phase switching mechanism according to an embodiment of the present disclosure, FIG. 2 is a circuit diagram of a three-phase motor and a motor driving circuit of the motor driver having the automatic phase switching mechanism according to the embodiment of the present disclosure, and FIGS. 3 and 4 are waveform diagrams of signals of the motor driver having the automatic phase switching mechanism according to the embodiment of the present disclosure.

The motor driver of the embodiment of the present disclosure may include a back electromotive force detecting circuit 10, a wave segment pattern storing circuit 20, a driving waveform generating circuit 30, a motor controlling circuit 40 and a motor driving circuit 50 as shown in FIG. 1.

As shown in FIG. 1, the driving waveform generating circuit 30 may be connected to the force detecting circuit 10, the wave segment pattern storing circuit 20 and the motor controlling circuit 40. The motor driving circuit 50 may be connected to the motor controlling circuit 40 and a three-phase motor MT.

The motor driving circuit 50 may include a plurality of switch components such as a first high-side switch HD1, a second high-side switch HD2, a third high-side switch HD3, a first low-side switch LD1, a second low-side switch LD2 and a third low-side switch LD3 as shown in FIG. 2. A control terminal of each of the switch components of the motor driving circuit 50 may be connected to an output terminal of the motor controlling circuit 40.

A first terminal of the first high-side switch HD1 may be coupled to a first input voltage VINU. A second terminal of the first high-side switch HD1 may be connected to a first terminal of the first low-side switch LD1. A second terminal of the first low-side switch LD1 may be coupled to a first reference voltage VGU. For example, the second terminal of the first low-side switch LD1 may be grounded. A node NU between the second terminal of the first high-side switch HD1 and the first terminal of the first low-side switch LD1 may be connected to a first terminal of a first coil CLU of the three-phase motor MT. A second terminal of the first coil CLU may be connected to a common terminal COM of the three-phase motor MT.

A first terminal of the second high-side switch HD2 may be coupled to a second input voltage VINV. A second terminal of the second high-side switch HD2 may be connected to a first terminal of the second low-side switch LD2. A second terminal of the second low-side switch LD2 may be coupled to a second reference voltage VGV. For example, the second terminal of the second low-side switch LD2 may be grounded. A node NV between the second terminal of the second high-side switch HD2 and the first terminal of the second low-side switch LD2 may be connected to a first terminal of a second coil CLV of the three-phase motor MT. A second terminal of the second coil CLV may be connected to the common terminal COM of the three-phase motor MT.

A first terminal of the third high-side switch HD3 may be coupled to a third input voltage VINW. A second terminal of the third high-side switch HD3 may be connected to a first terminal of the third low-side switch LD3. A second terminal of the third high-side switch HD3 may be coupled to a third reference voltage VGW. For example, the second terminal of the third low-side switch LD3 may be grounded. A node NW between the second terminal of the third high-side switch HD3 and the first terminal of the third low-side switch LD3 may be connected to a first terminal of a third coil CLW of the three-phase motor MT. A second terminal of the third coil CLW may be connected to the common terminal COM of the three-phase motor MT.

When the motor driver intends to drive the three-phase motor MT, the motor controlling circuit 40 may output a startup controlling signal to the control terminal of any one of the switch components of the motor driving circuit 50 within a startup time interval shown in FIG. 3. The motor driving circuit 50 may output a motor startup signal SPS shown in FIG. 3 to the three-phase motor MT to start up the three-phase motor MT according to the startup controlling signal from the motor controlling circuit 40.

After the three-phase motor MT is started up, the back electromotive force detecting circuit 10 may detect one or more of a back electromotive force signal EUS of a back electromotive force BEMFU of a U phase of the three-phase motor MT, a back electromotive force signal EVS of a back electromotive force BEMFV of a V phase of the three-phase motor MT, a back electromotive force signal EWS of a back electromotive force BEMFW of a W phase of the three-phase motor MT as shown in FIG. 2 to output a back electromotive force detected signal.

The wave segment pattern storing circuit 20 may store a first wave segment pattern signal. The first wave segment pattern signal may have a plurality of first wave segment patterns of a plurality of first waveform patterns. Each of the plurality of first waveform patterns has more than one of the plurality of first wave segment patterns. The plurality of first waveform patterns may include sinusoidal waveform, third harmonic waveforms, or a combination thereof, but the present disclosure is not limited thereto.

The driving waveform generating circuit 30 may, according to the back electromotive force detected signal from the back electromotive force detecting circuit 10, extract parts of the plurality of first wave segment patterns from the first wave segment pattern signal provided by the wave segment pattern storing circuit 20. The driving waveform generating circuit 30 may determine that the extracted first wave segment patterns are used as a plurality of first wave segments of a plurality of complete (or incomplete) waveforms of a first waveform signal (such as a first waveform signal WS21 or WS22 as shown in FIG. 4). The driving waveform generating circuit 30 may output the first waveform signal to the motor controlling circuit 40.

After the three-phase motor MT is started up within the startup time interval, the motor controlling circuit 40 may output a normal rotation controlling signal to the motor driving circuit 50, according to the first waveform signal (such as the first waveform signal WS21 or WS22 as shown in FIG. 4). The motor driving circuit 50 may output a normal rotation driving signal to the three-phase motor MT to drive the three-phase motor MT to normally rotate according to the normal rotation controlling signal within a normal rotation time interval.

If necessary, the driving waveform generating circuit 30 may compare a plurality of values of the first waveform signal (such as the first waveform signal WS21 or WS22 as shown in FIG. 4) with a second waveform signal (such as a second waveform signal WS1 as shown in FIG. 4) to output a driving waveform signal (such as a driving waveform signal WLS as shown in FIG. 4).

For example, the plurality of waveforms of the first waveform signal may include sinusoidal waveforms, third harmonic waveforms, or a combination thereof, and a plurality of waveforms of the second waveform signal may include triangle waveforms, sawtooth waveforms, or a combination thereof, but the present disclosure is not limited thereto.

After the three-phase motor MT is started up within the startup time interval, the motor controlling circuit 40 may, according to the driving waveform signal (such as the driving waveform signal WLS as shown in FIG. 4), output the normal rotation controlling signal to (the control terminal of the third high-side switch HD3 connected to the third coil CLW of the W phase of the three-phase motor MT of) the motor driving circuit 50. The motor driving circuit 50 may, according to the normal rotation controlling signal, output the normal rotation driving signal to the three-phase motor MT to drive the three-phase motor MT to normally rotate within the normal rotation time interval. In addition, the motor driving circuit 50 may output other normal rotation driving signals ULS and VLS to the three-phase motor MT.

It is worth noting that, if the three-phase motor MT is intended to be quickly driven to normally rotate after the three-phase motor MT is started up, the back electromotive force BEMFU of the U phase of the three-phase motor MT, the back electromotive force BEMFV of the V phase of the three-phase motor MT and the back electromotive force BEMFW of the W phase of the three-phase motor MT as shown in FIG. 2 must be detected as described above.

However, when the back electromotive force detecting circuit 10 detects any one of the back electromotive force signals EUS, EVS, EWS, the motor controlling circuit 40 must turn off the switch components of the motor driving circuit 50 for periods of time, which causes noise generated by the three-phase motor MT of a fan. For example, when the back electromotive force detecting circuit 10 detects the back electromotive force signal EWS of the W phase of the three-phase motor MT, the motor controlling circuit 40 must turn off the third high-side switch HD3 and the third low-side switch LD3 of the motor driving circuit 50 that are connected to a terminal of the W phase of the three-phase motor MT. As a result, a current is stopped flowing through the third coil CLW of the W phase of the three-phase motor MT.

The number of times that the back electromotive force detecting circuit 10 detects the back electromotive force signals EUS, EVS, EWS is proportional to a level of the noise generated by the three-phase motor MT. Therefore, the number of times that the back electromotive force detecting circuit 10 detects the back electromotive force signals EUS, EVS, EWS depends on accuracy requirements of a normal operation of the three-phase motor MT and an acceptable noise level.

For example, after the three-phase motor MT is started up, the back electromotive force detecting circuit 10 only detects a voltage level of a first one of a plurality of waveforms of a back electromotive force signal BEMFS as shown in FIG. 3 to output the back electromotive force detected signal. If necessary, after the first one of the plurality of waveforms of the back electromotive force signal BEMFS is detected, the back electromotive force detecting circuit 10 may further detect voltage levels of any other one or more of the plurality of waveforms of the back electromotive force signal BEMFS to output the back electromotive force detected signal.

In the embodiment, the back electromotive force detecting circuit 10 may detect zero crossing points at which the first one of the plurality of waveforms of the back electromotive force signal BEMFS of each of the U, V and W phases of the three-phase motor MT respectively transits from a low level to a high level and transits from the high level to the low level to output the back electromotive force detected signal.

That is, after the three-phase motor MT is started up or the back electromotive force detecting circuit 10 starts detecting the back electromotive force signal BEMFS, the back electromotive force detecting circuit 10 may determine the first one of the plurality of waveforms of the back electromotive force signal BEMFS first reaches which one of the above-mentioned zero crossing points to output the back electromotive force detected signal. In the embodiment, each of the zero-crossing points is a time point at which the back electromotive force signal BEMFS reaches a zero value.

As shown in FIG. 3, after the startup time interval ends, the back electromotive force detecting circuit 10 starts detecting the back electromotive force signal BEMFS of each of the U, V and W phases of the three-phase motor MT. The back electromotive force detecting circuit 10 first detects the zero-crossing point at which the first one of the plurality of waveforms of the back electromotive force signal BEMFS transits from the low level to the high level.

After the back electromotive force detecting circuit 10 detects the zero-crossing points of the first one of the plurality of waveforms of the back electromotive force signal BEMFS as described above, the back electromotive force detecting circuit 10 may detect other zero-crossing points at which others of the plurality of waveforms of the back electromotive force signal BEMFS of each of the U, V and W phases of the three-phase motor MT transit from the low level to the high level to output the back electromotive force detected signal.

If necessary, the back electromotive force detecting circuit 10 may also detect zero-crossing points at which the others of the plurality of waveforms of the back electromotive force signal BEMFS of each of the U, V and W phases of the three-phase motor MT transit from the high level to the low level to output the back electromotive force detected signal.

The driving waveform generating circuit 30 may extract parts of the plurality of first wave segment patterns as the first wave segments of the first waveform signal, according to the back electromotive force signal BEMFS. A first one of the plurality of waveforms of the first waveform signal may be a portion of or an entire of a sinusoidal waveform or a third harmonic waveform. The first one of the plurality of waveforms of the first waveform signal may depend on the time point at which the back electromotive force signal BEMFS reaches the zero value and a change in a voltage level of the back electromotive force signal BEMFS.

When a voltage of the back electromotive force signal BEMFS is higher than the zero value, the driving waveform generating circuit 30 may extract parts of the plurality of first wave segment patterns from the first wave segment pattern signal as the plurality of wave segments of the first waveform signal. The driving waveform generating circuit 30 may output the first waveform signal having the extracted first wave segment patterns within a time after the voltage of the back electromotive force signal BEMFS decreases to the zero value.

When the voltage of the back electromotive force signal BEMFS is lower than the zero value, the driving waveform generating circuit 30 may extract parts of the plurality of first wave segment patterns from the first wave segment pattern signal as the plurality of wave segments of the first waveform signal. The driving waveform generating circuit 30 may output the extracted first wave segment patterns within a time after the voltage of the back electromotive force signal BEMFS increases to the zero value.

Figure 5:
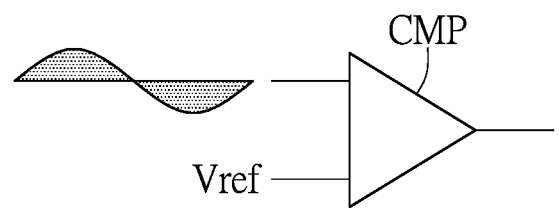
FIG. 5 is a circuit diagram of a back electromotive force detecting circuit and the motor driver having the automatic phase switching mechanism according to the embodiment of the present disclosure.

Reference is made to FIGS. 1 and 5, in which FIG. 1 is a block diagram of a motor driver having an automatic phase switching mechanism according to an embodiment of the present disclosure, and FIG. 5 is a circuit diagram of a back electromotive force detecting circuit and the motor driver having the automatic phase switching mechanism according to the embodiment of the present disclosure.

The back electromotive force detecting circuit 10 may include a comparing circuit. The comparing circuit may include one or more comparators such as a first comparator CMP as shown in FIG. 5. In practice, the comparing circuit of the back electromotive force detecting circuit 10 may further include a second comparator and a third comparator.

The first comparator CMP may be configured detect the back electromotive force signal (such as the back electromotive force signal EUS as shown in FIG. 2) of the U phase of the three-phase motor MT. The second comparator may be configured detect the back electromotive force signal (such as the back electromotive force signal EVS as shown in FIG. 2) of the V phase of the three-phase motor MT. The third comparator may be configured detect the back electromotive force signal (such as the back electromotive force signal EWS as shown in FIG. 2) of the W phase of the three-phase motor MT.

A first input terminal of the first comparator CMP may be connected to the second terminal of the first coil CLU of the three-phase motor MT, and may receive the back electromotive force signal EUS from the second terminal of the first coil CLU. A first input terminal of the second comparator may be connected to the second terminal of the second coil CLV of the three-phase motor MT, and may receive the back electromotive force signal EVS from the second terminal of the second coil CLV. A first input terminal of the third comparator may be connected to the second terminal of the third coil CLW of the three-phase motor MT, and may receive the back electromotive force signal EWS from the second terminal of the third coil CLW.

A second input terminal of the first comparator CMP may be coupled to a first reference voltage Vref. A first input terminal of the second comparator may be coupled to a second reference voltage. A first input terminal of the third comparator may be coupled to a third reference voltage.

The first comparator CMP may compare a voltage of the back electromotive force signal EUS with the first reference voltage Vref to output the back electromotive force detected signal to the driving waveform generating circuit 30. The first reference voltage may be half of a sum of a peak value and a valley value of a waveform of the back electromotive force signal EUS, but the present disclosure is not limited thereto.

The second comparator may compare a voltage of the back electromotive force signal EVS with the second reference voltage to output the back electromotive force detected signal to the driving waveform generating circuit 30. The second reference voltage may be half of a sum of a peak value and a valley value of a waveform of the back electromotive force signal EVS, but the present disclosure is not limited thereto.

The third comparator may compare a voltage of the back electromotive force signal EWS with the third reference voltage to output the back electromotive force detected signal to the driving waveform generating circuit 30. The third reference voltage may be half of a sum of a peak value and a valley value of a waveform of the back electromotive force signal EWS, but the present disclosure is not limited thereto.

Figure 6:
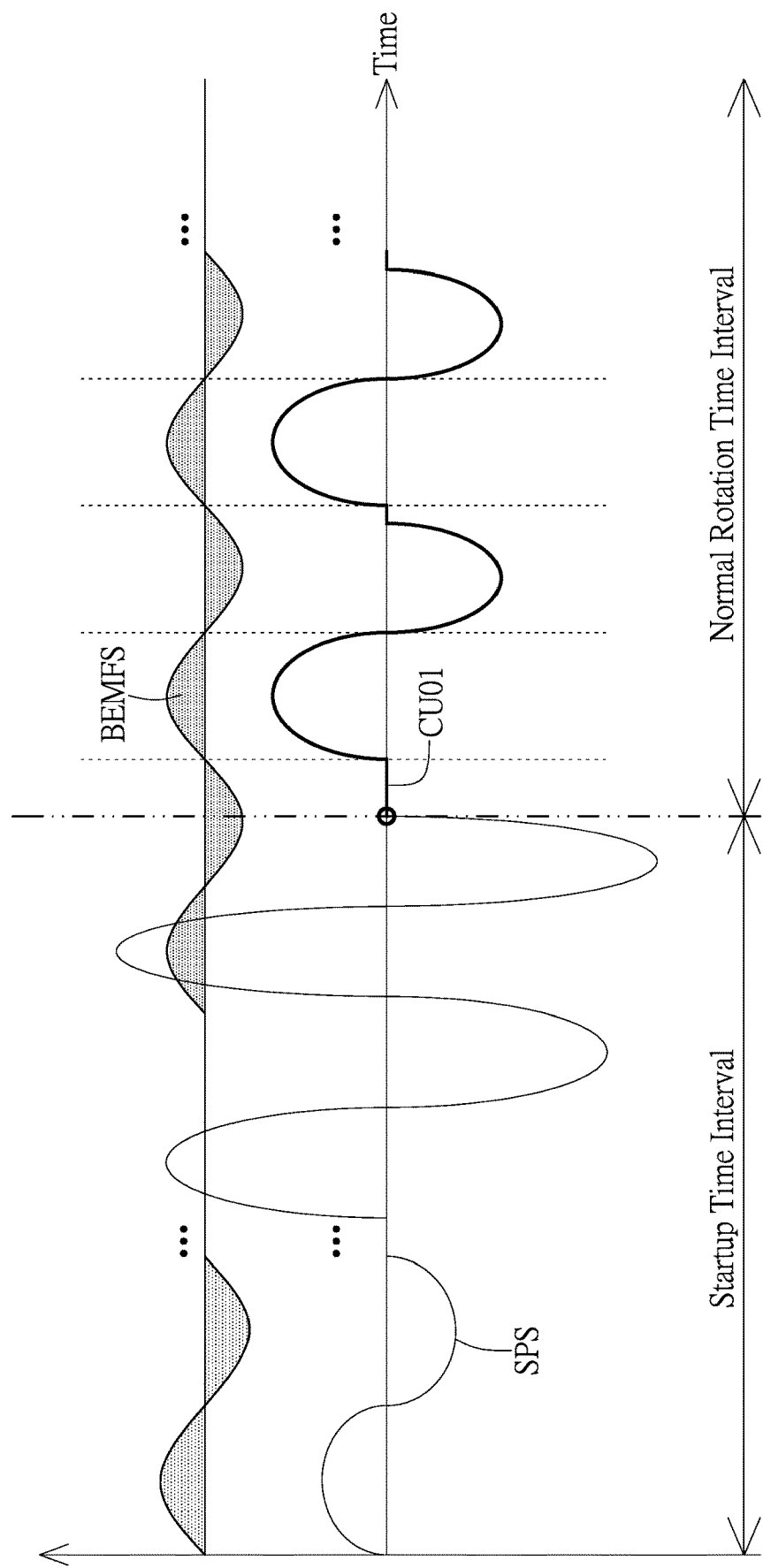
FIG. 6 is a waveform diagram of signals generated when a phase of a back electromotive force signal and a phase of the three-phase motor that is driven by the motor driver of the embodiment of the present disclosure and a conventional motor driver are equal to each other.
Figure 7:
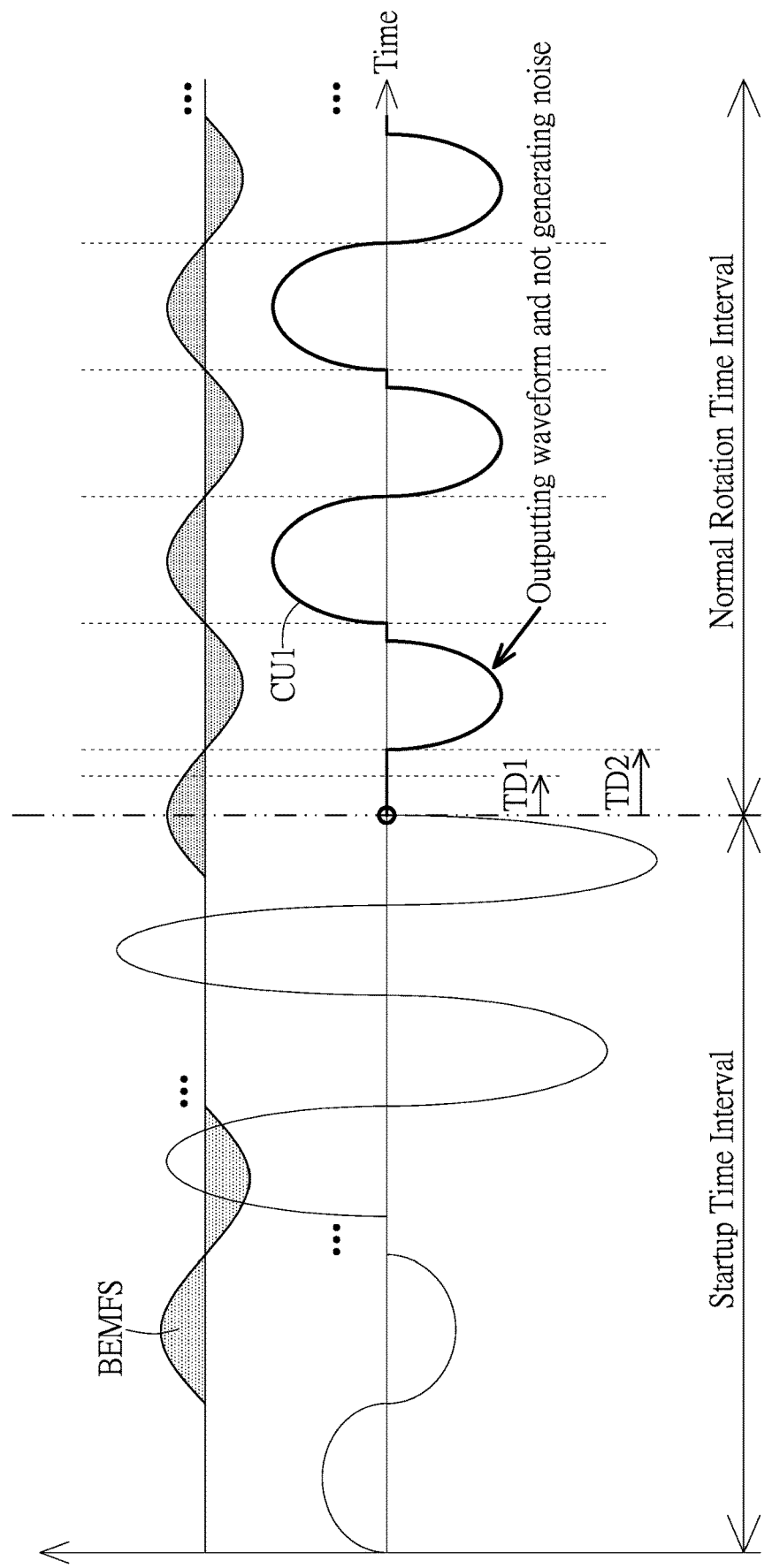
FIG. 7 is a waveform diagram of signals generated when a phase of a back electromotive force signal and a phase of the three-phase motor being driven by the motor driver of the embodiment of the present disclosure are not equal to each other.
Figure 8:
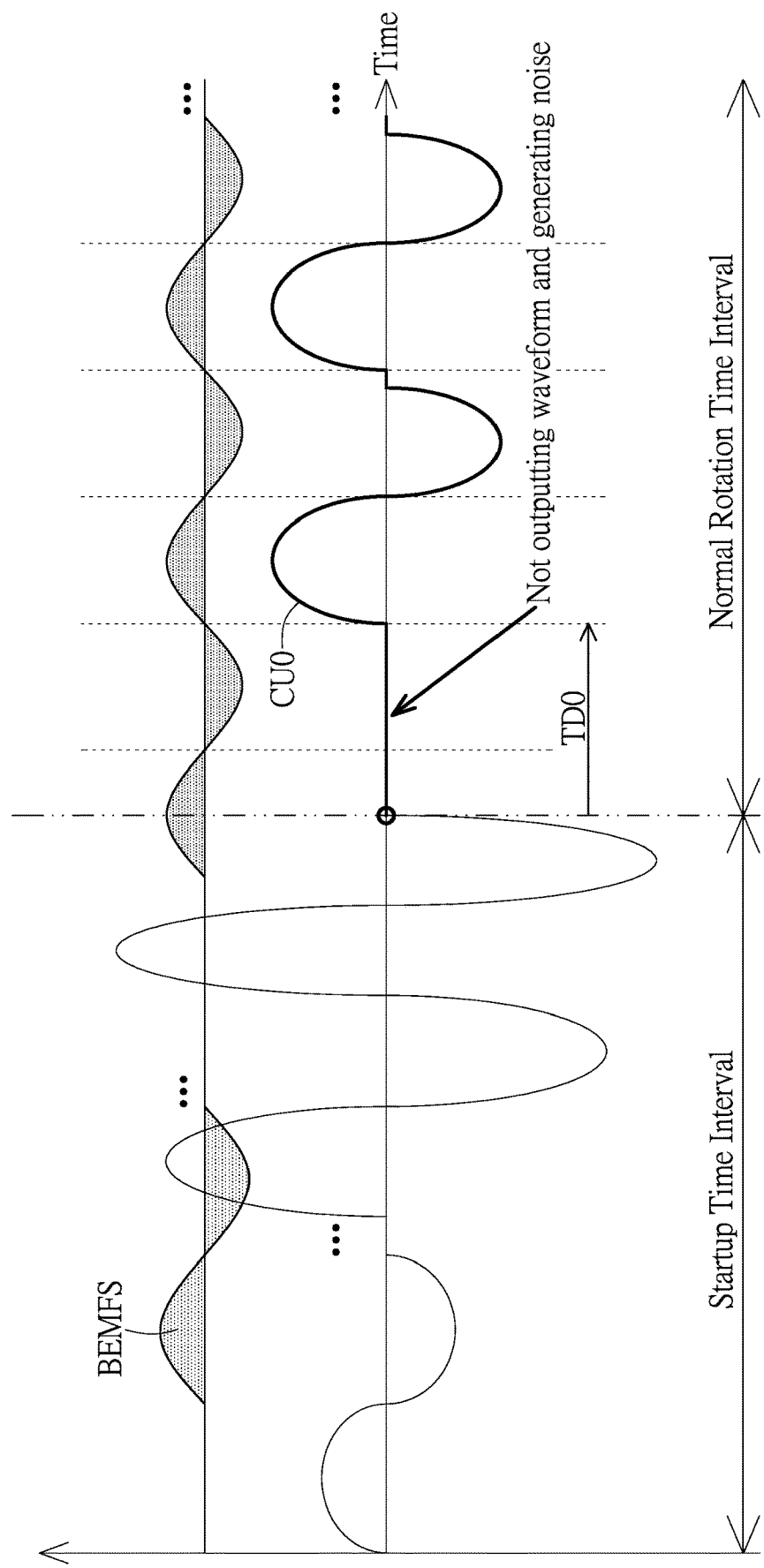
FIG. 8 is a waveform diagram of signals generated when a phase of a back electromotive force signal and a phase of the three-phase motor being driven by the conventional motor driver are not equal to each other.

Reference is made to FIGS. 1 and 6 to 8, in which FIG. 6 is a waveform diagram of signals generated when a phase of a back electromotive force signal and a phase of the three-phase motor that is driven by the motor driver of the embodiment of the present disclosure and a conventional motor driver are equal to each other, FIG. 7 is a waveform diagram of signals generated when a phase of a back electromotive force signal and a phase of the three-phase motor being driven by the motor driver of the embodiment of the present disclosure are not equal to each other, and FIG. 8 is a waveform diagram of signals generated when a phase of a back electromotive force signal and a phase of the three-phase motor being driven by the conventional motor driver are not equal to each other.

A phase of the back electromotive force signal and a phase of the three-phase motor MT that is driven by the motor driver of the present disclosure and the conventional motor driver may be equal to each other (, and an actual position of a rotor of the three-phase motor MT is at a position at which the back electromotive force signal is generated). Under this condition, as shown in FIG. 6, after a short time has elapsed since a time point at which the three-phase motor MT enters the normal rotation time interval from the startup time interval, the motor driver of the present disclosure and the conventional motor driver output a first waveform signal CU01 for driving the three-phase motor MT.

It is worth noting that, the phase of the back electromotive force signal and the phase of the three-phase motor MT being driven by the conventional motor driver may not be equal to each other. Under this condition, as shown in FIG. 8, the conventional motor driver does not output a first waveform signal CU0 for driving the three-phase motor MT until a very long detected time TD0 has elapsed since a time point at which the three-phase motor MT enters the normal rotation time interval from the startup time interval, which causes noise generated by the three-phase motor MT.

In contrast, after the motor driver of the present disclosure starts up the three-phase motor MT, the motor driver of the present disclosure captures the voltage of the waveform of the back electromotive force signal BEMFS of the three-phase motor MT within a capturing time TD1 as shown in FIG. 7. The first comparator CMP as shown in FIG. 5 compares the voltage of the back electromotive force signal BEMFS with the first reference voltage Vref to detect the zero crossing points at which the waveform of the back electromotive force signal BEMFS of the three-phase motor MT respectively transits from the low level to the high level and transits from the high level to the low level, within a detecting time TD2 as shown in FIG. 7.

It should be understood that, the capturing time TD1 is shorter than the detecting time TD2. Under this condition, the first comparator CMP has enough time to perform the comparison operation to detect the zero crossing points of the back electromotive force signal BEMFS as described above.

The phase of the back electromotive force signal and the phase of the three-phase motor MT being driven by the motor driver of the present disclosure may not be equal to each other. Under this condition, after the three-phase motor MT is started up, the motor driver of the present disclosure determines whether or not the voltage of the back electromotive force signal BEMFS is higher than the first reference voltage Vref within the capturing time TD1 of the normal operation time interval as shown FIG. 7. If the voltage of the back electromotive force signal BEMFS is higher than the first reference voltage Vref, the motor driver of the present disclosure determines that the back electromotive force signal BEMFS will transit from the high level to the low level. Accordingly, when the back electromotive force signal BEMFS reaches the zero crossing point at which the back electromotive force signal BEMFS transits from the high level to the low level, the motor driver of the present disclosure instantly outputs bottom of a first waveform signal CU1 without waiting for a very long time such as the detecting time TD0 shown in FIG. 8. That is, at most the short detecting time TD2 (that is shorter than the detecting time TD0) is elapsed since the three-phase motor is started up, the motor driver of the present disclosure outputs the first waveform signal CU1 for driving the three-phase motor MT to rotate normally. As a result, noise can be effectively prevented from being generated by the three-phase motor MT.

When the three-phase motor MT enters into the normal operation time interval, the motor driver of the present disclosure determines whether or not the voltage of the back electromotive force signal BEMFS is lower than the first reference voltage Vref within the capturing time TD1. If the voltage of the back electromotive force signal BEMFS is lower than the first reference voltage Vref, the motor driver of the present disclosure determines that the back electromotive force signal BEMFS will transit from the low level to the high level. Accordingly, when the back electromotive force signal BEMFS reaches the zero crossing point at which the back electromotive force signal BEMFS transits from the low level to the high level, the motor driver of the present disclosure instantly outputs top of the first waveform signal CU1. Similarly, as shown in FIG. 6, top of the first waveform signal CU01 is outputted first.

That is, the motor driver of the present disclosure determines whether or not the voltage of the back electromotive force signal BEMFS is higher or lower than the first reference voltage Vref to determine that the back electromotive force signal BEMFS will transit from the low level to the high level or transit from the high level to the low level, within the capturing time TD1. Accordingly, the motor driver of the present disclosure determines which one of the top and the bottom of the first waveform signal CU1 must be outputted first. The voltage level of the back electromotive force signal BEMFS is captured within the capturing time TD1, and then the zero crossing point of the back electromotive force signal BEMFS is detected within remaining of the detecting time TD2. Therefore, the capturing time TD1 must be smaller than the detecting time TD2. As a result, after the capturing time TD1 ends, the first comparator CMP has enough time to perform the comparison operation within the remaining of the detecting time TD2.

In conclusion, the present disclosure provides the motor driver having the automatic phase switching mechanism. After the three-phase motor is started up, the motor driver of the present disclosure can detect the zero crossing points at which the back electromotive force signal respectively transits from the high level to the low level and transits from the low level to the high level, and accordingly determine the waveforms of the first waveform signal that are used to quickly drive the three-phase motor to rotate normally.

If the phase of the three-phase motor of the fan of a handheld device in a moving condition or other conditions is not as expected, the motor driver of the present disclosure can automatically change the phase of the three-phase motor, such that the three-phase motor can operate normally.

Regardless of the phase of the back electromotive force, the motor driver of the present disclosure can detect the back electromotive force signal within the short detecting time and accordingly quickly drive the three-phase motor to rotate normally, thereby reducing vibration and noise of the three-phase motor.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A motor driver having an automatic phase switching mechanism, which is applicable to a three-phase motor, the motor driver comprising:
   a motor controlling circuit configured to output a startup controlling signal and a normal rotation controlling signal;
   a motor driving circuit connected to the motor controlling circuit, configured to output a motor startup signal to the three-phase motor to start up the three-phase motor according to the startup controlling signal, and configured to output a normal rotation driving signal to the three-phase motor to drive the three-phase motor to rotate normally according to the normal rotation controlling signal after the three-phase motor is started up;
   a back electromotive force detecting circuit connected to the three-phase motor, and configured to start detecting a voltage level of a back electromotive force signal of each of three phases of the three-phase motor to output a back electromotive force detected signal after the three-phase motor is started up;
   a wave segment pattern storing circuit configured to store a first wave segment pattern signal having a plurality of first wave segment patterns of a plurality of first waveform patterns; and
   a driving waveform generating circuit connected to the back electromotive force detecting circuit, the wave segment pattern storing circuit and the motor controlling circuit, wherein the driving waveform generating circuit extracts parts of the plurality of first wave segment patterns from the first wave segment pattern signal as a plurality of first wave segments of a first waveform signal, the driving waveform generating circuit outputs the first waveform signal, and the motor controlling circuit outputs the normal rotation controlling signal according to the first waveform signal;
   wherein the back electromotive force detecting circuit detects a zero crossing point at which each one of a plurality of waveforms of the back electromotive force signal of each of the three phases of the three-phase motor transits from a low level to a high level to output the back electromotive force detected signal except for a first one of the plurality of waveforms of the back electromotive force signal, and the zero crossing point is a time point at which the back electromotive force signal reaches a zero value.

2. The motor driver according to claim 1, wherein the back electromotive force detecting circuit detects zero crossing point at which the first one of the plurality of waveforms of the back electromotive force signal of each of the three phases of the three-phase motor respectively transits from the high level to the low level to output the back electromotive force detected signal.

3. The motor driver according to claim 1, wherein the driving waveform generating circuit determines which parts of the plurality of first wave segment patterns are extracted as the plurality of first wave segments of the first waveform signal, according to the back electromotive force detected signal that indicates the zero crossing point at which the back electromotive force signal transits from the low level to the high level.

4. The motor driver according to claim 1, wherein the driving waveform generating circuit determines which parts of the plurality of first wave segment patterns are extracted as the plurality of first wave segments of the first waveform signal, according to the back electromotive force detected signal that indicates the zero crossing point at which the back electromotive force signal transits from the high level to the low level.

5. The motor driver according to claim 1, wherein, when a voltage of the back electromotive force signal is higher than a zero value, the driving waveform generating circuit extracts parts of the plurality of first wave segment patterns from the first wave segment pattern signal as the plurality of first wave segments of the first waveform signal outputted within a period of time after the voltage of the back electromotive force signal decreases to the zero value.

6. The motor driver according to claim 1, wherein, when a voltage of the back electromotive force signal is lower than a zero value, the driving waveform generating circuit extracts parts of the plurality of first wave segment patterns as the plurality of first wave segments of the first waveform signal outputted within a period of time after the voltage of the back electromotive force signal increases to the zero value.

7. The motor driver according to claim 1, wherein the back electromotive force detecting circuit includes a comparing circuit, a first input terminal of the comparing circuit is connected to the three-phase motor and receives the back electromotive force signal from the three-phase motor, a second input terminal of the comparing circuit is coupled to a reference voltage, and the comparing circuit compares a voltage of the back electromotive force signal with the reference voltage to output the back electromotive force detected signal.

8. The motor driver according to claim 7, wherein the reference voltage is half of a sum of a peak value and a valley value of a waveform of the back electromotive force signal.

9. The motor driver according to claim 1, wherein the driving waveform generating circuit compares a plurality of values of the first waveform signal with those of a second waveform signal to output a driving waveform signal, and the motor controlling circuit adjusts the normal rotation controlling signal outputted to the motor driving circuit according to the driving waveform signal.

10. The motor driver according to claim 9, wherein a plurality of waveforms of the second waveform signal include triangle waveforms, sawtooth waveforms, or a combination thereof.

11. The motor driver according to claim 1, wherein a plurality of waveforms of the first waveform signal include sinusoidal waveforms, third harmonic waveforms, or a combination thereof.

* * * * *